United States Patent [19]

Burgbacher

[11] 3,775,626
[45] Nov. 27, 1973

[54] EXTERNAL-ROTOR RELUCTANCE MOTOR
[75] Inventor: Martin Burgbacher, St. Georgen, Black Forest, Germany
[73] Assignee: Papst-Motoren KG, Georgen/Schwarzwald, Germany
[22] Filed: Jan. 27, 1972
[21] Appl. No.: 221,275

[30] Foreign Application Priority Data
Jan. 29, 1971 Germany .................. P 21 04 189.4

[52] U.S. Cl. .................. 310/67, 310/162, 310/261, 310/163
[51] Int. Cl. ........................................ H02k 19/14
[58] Field of Search .................... 310/67, 162–164, 310/211, 261

[56] References Cited
UNITED STATES PATENTS
3,113,230   12/1963   Linkous .................. 310/162
3,002,118    9/1961   Papst ..................... 310/67 X
3,596,121    7/1971   Chang .................... 310/67 X
2,483,848   10/1949   Saretzky ................. 310/162
3,054,009    9/1962   Papst ..................... 310/163 X
2,733,362   10/1956   Bauer et al. ............. 310/162

Primary Examiner—D. F. Duggan
Attorney—Michael S. Striker

[57] ABSTRACT

A external-rotor reluctance motor has a rotor provided with a plurality of pole portions. Each pole portion has respective pole ends, a pole span between said ends, and a pole middle. The rotor has a given effective yoke cross-section over part of a pole span and a lesser effective yoke cross-section in the vicinity of the respective pole middle and over substantial portions of the associated pole span. The novel reluctance motor exhibits greatly improved pull-in and pull-out torque.

19 Claims, 16 Drawing Figures

EXTERNAL-ROTOR RELUCTANCE MOTOR

BACKGROUND OF THE INVENTION

The present invention relates to synchronous machines, and more specifically to synchronous motors. In particular, the invention relates to reluctance motors having an external rotor.

Reluctance motors operate synchronously and are already known. They are used more and more widely in industrial applications because they provide a highly constant able speed output over a range of load-torque conditions, and are thus suitable for many applications where constant speed control is of importance. It is not thought necessary to explain in detail the concept and operation of the reluctance motor per se.

The best known reluctance motor construction makes use of salient poles, each pole being associated with an interpolar space. However, with such construction it is not possible to guarantee a predetermined ratio of direct axis reactance to quadrature-axis reactance, and the efficiency and usefulness of the motor are accordingly somewhat limited.

Accordingly, recent developments have included development of external-rotor reluctance motors in which salient poles are not employed; and in which the peripheral air gap between stator and rotor is accordingly substantially constant. In addition, various attempts have been made to improve the rotors of such external-rotor reluctance machines.

One expedient which has recently come into use is to provide in the rotor yoke, radially outwards of the conductor-carrying slots, a cavity accommodating a non-magnetic portion, substantially in the vicinity of a pole middle. Often, such cavities are formed by the alignment of voids of holes stamped into the individual rotor plates which in stacked condition form the rotor shell.

Thereafter, according to conventional practice, such cavity, as well as th slots for current conductors, is filled with a suitable non-magnetic, electrically conductive material.

After such filling has taken place, the stamped, or otherwise produced holes near the pole-middle define barriers and guides for flux, and thereby help determine the reluctance distribution of the rotor.

With such newer constructions, however, certain disadvantages still prevail and call for improvement. In particular, these relate to the pull-in and pull-out torque characteristics heretofore achieved. As is known, the pull-in torque is that torque which the motor can produce during start-up, thereby reaching synchronous operation despite initial loading. Likewise, the pull-out torque is that torque which causes a motor operating synchronously to fall out of synchronism. It is of course desirable to provide synchronous motors with pull-in and pull-out torque characteristics that are as high as possible, and for many applications the torque characteristics now available with motors of a given size and expense are not satisfactory.

SUMMARY OF THE INVENTION

Accordingly, it is a general object of the present invention to provide a reluctance motor which overcomes the disadvantages and shortcomings associated with prior art reluctance motors.

More specifically, it is an object of the invention to provide an external-rotor reluctance motor which exhibits high pull-in and pull-out torque characteristics.

According to one advantageous concept of the invention an external-rotor reluctance motor may comprise a rotor provided with a plurality of pole portions each having respective pole ends, a pole span between said ends, and a pole middle.

Importantly, according to such concept, the rotor has a given effective yoke cross-section over part of the respective pole span and a lesser effective magnetic cross-section in the vicinity of a respective pole middle and over substantial portions of the associated pole span.

By so designing the effective yoke cross-section of the rotor, portions of increased magnetic reluctance for quadrature-axis flux may be significantly increased at desired locations, with resulting better distribution of flux in the air gap. The better distribution of flux can result in improved torque characteristics.

According to another advantageous concept of the invention, the rotor is provided over a substantial portion of its individual pole spans with a plurality of non-magnetic portions of differing size and/or configuration and spaced from the outer periphery of the rotor. These non-magnetic portions serve to reduce the given effective yoke cross-section of the rotor to a lesser effective yoke cross-section, and thereby increase the magnetic resistance of the rotor at certain locations. With this constructional possibility, flux-path portions of magnetic material are provided between respectively adjoining non-magnetic portions provided in the rotor yoke. In addition, the rotor is provided at its inner periphery with radially inwardly projecting teeth, and advantageously the flux-path portions between adjoining non-magnetic portions may be more-or-less aligned with neighboring rotor reeth. This will be illustrated and explained in detail.

Also, it is contemplated according to the invention to vary the effective magnetic cross-section of the rotor yoke in such manner that the cross-section is smallest near the respective pole middles and increases substantially continuously toward the respective pole ends. This also will be shown and explained in detail.

Finally and very importantly, is is noted that with the invention it is possible to so dimension the magnetic flux-path portions located on either side of the respective pole-middles that, during idling of the synchronous motor, these flux-path portions and/or the neighboring yoke portions will be substantially in the saturation region, though not necessarily far into the region of over-saturation. In this way it is possible to provide sufficient magnetic cross-section for the direct-axis flux components, while at the same time providing a high magnetic resistance for the undesired quadrature-axis flux components, especially in the region of the pole middles. With such design, flux irregularities can be consdierable reduced.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
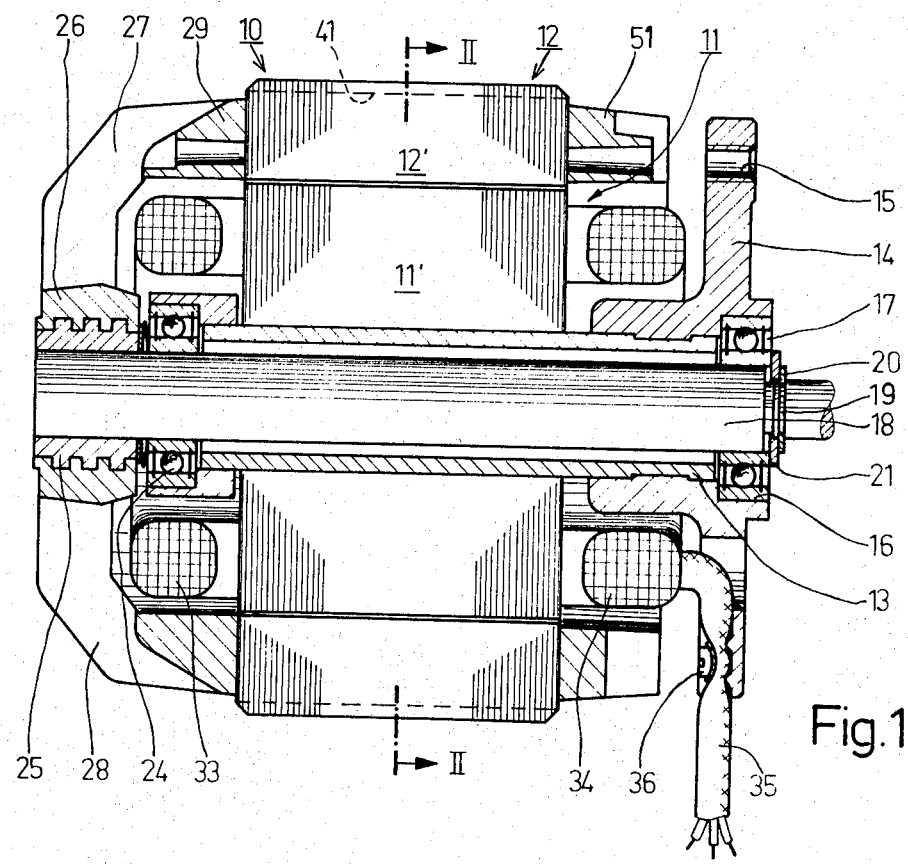
FIG. 1 is a longitudinal section through a reluctance motor embodying the present invention, and taken on line I—I of FIG. 2.

FIG. 1 illustrates in sectional view an external-rotor reluctance motor 10, which has a fixedly mounted internal stator 11 with stator laminations 11', as well as a rotor 12 with rotor laminations 12', the latter being mounted for rotation about the stator. The stator 11 is fixedly secured on a support pipe 13 by pressure-fitting, or in other suitable manner, and the support pipe 13 in turn is cast with, or otherwise connected with and supported by a flange 14. The flange 14 is shown provided with a bore 15 which may be used for mounting the motor onto an apparatus to be driven. The various details of construction shown in FIG. 1 are provided merely for the sake of concrete illustration, and do not form part of the invention.

Towards the right in FIG. 1, the flange 14 is provided with a bore 16 in which is mounted the outer run of a ball bearing 17, whose inner run mounts the right end of a shaft 18. A circlip 20 and ring 21 serve to retain the right end face of the ball bearing 17.

The shaft 18 extends through the entire length of the support pipe 13. At its left end it is mounted in a second ball bearing 24 and supports at this end a sleeve mounting 25 in force-fit relationship therewith. The mounting sleeve 25, which may be made of steel, in turn supports an aluminum ring 26. The aluminum ring 26 caries, for instance, a total of 16 arms of which in FIG. 1 only arms 27 and 28 are visible. The arms extend axially outwards and together mount a short circuit ring 29 provided at an axial end of the assembly of rotor laminations 12'.

The stator 11 is provided in conventional manner with slots 32 (see FIG. 2) in which is provided a conventional three-phase winding, whose left winding end is shown in FIG. 1 at 33 and whose right winding end is shown at 34. A three-wire supply cable 35 is connected with the right winding end 34 and is fixedly secured to flange 14 by means of a clamping arrangement 36, or the like. The flange 14 and stator 11 are fixedly connected and cannot turn with respect to each other.

Figure 2:
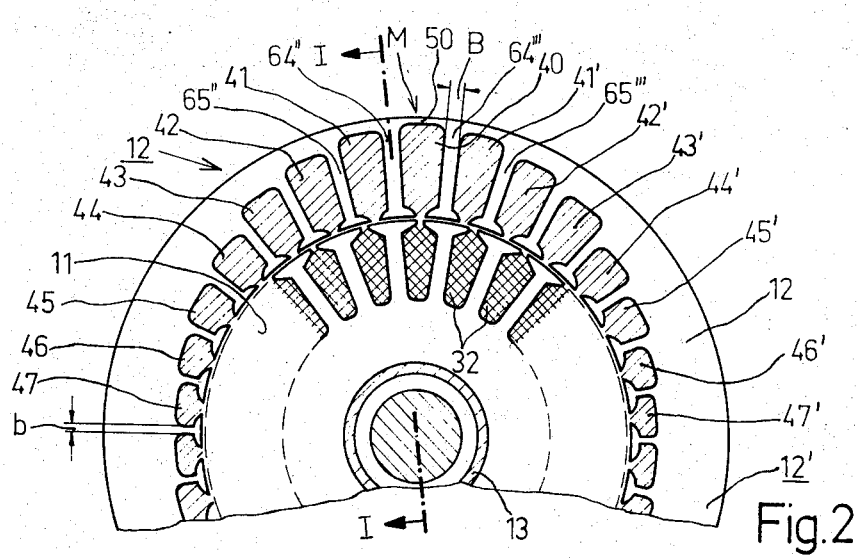
FIG. 2 is a transverse section through the reluctance motor of FIG. 1, taken on line II—II of FIG. 1.

FIG. 2 illustrates a rotor according to the invention in transverse section. In the event that the rotor is formed of a plurality of stacked substantially annular rotor plates, FIG. 2 would illustrate the general configuration of one such rotor plate.

It will be seen that the rotor 12 of FIG. 2 is provided with a plurality of conductor slots 40–47 and 41' – 47' of different depth and width. The rotor illustrated in FIG. 2 is that of a two-pole reluctance motor, each pole of which has a pole span of 180° mechanical degrees. The pole middle of the pole illustrated in FIG. 2 is designated M, and the respective pole ends, at the extremes of the pole span, are accordingly spaced from the pole middle M by 90° mechanical degrees each.

The deepest slot 40 is positioned in the vicinity of the pole middle, and the depth of successive slots to either side of the pole middle decreases continuously in direction towards the respective ends. At the same time, the width of slots increases in direction towards the pole ends, so that the teeth 64', 65', 64'', 65'', etc., are accordingly narrowest in the region of the pole ends and widest in the region of the pole middles. The width of tooth 64'', for example, is designated B and will be seen to considerably exceed the width b of a tooth located near the left-hand pole end. The various slots are each filled with non-magnetic material of good electrical conductivity, such as for instance aluminum or aluminum alloy, whereas the remainder of the rotor 12, including the radially inwardly projecting teeth as well as the rotor yoke inwardly of which the teeth extend, is composed at least substantially of magnetic material.

It will be appreciated that in the rotor of FIG. 2 the radially inwardly extending teeth 64, 65 etc., and the conductor slots 41–47, etc., between adjacent ones of the latter, extend about the entire inner periphery of the rotor; likewise the rotor half not illustrated is of the same configuration as that shown. With the variations in thickness and width of the slots just described, it will be seen that the rotor has an effective magnetic cross-section which varies in circumferential direction of the rotor, and which is smallest in the vicinity of a pole middle and greatest in the vicinity of the respective pole ends. In FIG. 2 the rotor yoke portion of smallest effective cross-section is designated 50.

Because, according to the invention, the effective cross-section of the rotor yoke is deliberately narrowed not only in the immediate vicinity of the pole middle but over a substantial percentage of the pole span, the pull-in and pull-out torque characteristics of the reluctance motor in which the rotor of FIG. 2 is incorporated, are very significantly improved. A rigorous explanation of this unexpected improvement is not yet available, but it is presently thought that the improvement may possibly be due to the cooperation of two factors:

1. The deliberate reduction of the effective rotor yoke cross-section over a substantial percentage of a pole span results in a considerable increase of the magnetic resistance presented to quadrature-axis flux, and the flux distribution in the air gap between rotor and stator is thereby significantly improved, approximately more nearly the sinusoidal flux distribution desired.

2. Flux irregularities (induction humps and dips) in the inductive characteristics of the air gap are compensated. This effect will be explained somewhat more clearly with reference to FIGS. 7–10.

The slots 41–47, etc., of the rotor shown in FIG. 2 are, as already mentioned, filled with aluminum or another suitable material, and the conductors thusly formed in the slots are joined at their left ends (in FIG. 1) by short-circuit ring 29 and at their right ends (in FIG. 1) by short-circuit ring 51, the connection effected advantageously being both electrical and mechanical. In conventional manner, the short-circuit rings 29 and 51, the aluminum conductors in the rotor slots, and even the arms 27, 28 etc., and the mounting ring 26, may be cast in a single operation, so as to produce a unitary rotor 1e having great stability and solicity, and constituting a housing for the motor 10.

In those situation where the rotor is to be constructed from a plurality of stacked rotor plates, it may be desirable for reasons of economy to employ prefabricated rotor plates of the type commercially available but which, however, are not constructed according to the concepts of the present invention. In particular, it may be desired to employ rotor plates of the type used in the rotors of a synchronous machine.

Specifically, it may be desired to employ annular rotor plates each of which is provided along its inner periphery with conductor-accommodating slots of identical configuration. Such rotor plates have an effective yoke cross-section which is substantially constant in circumferential direction.

Figure 3:
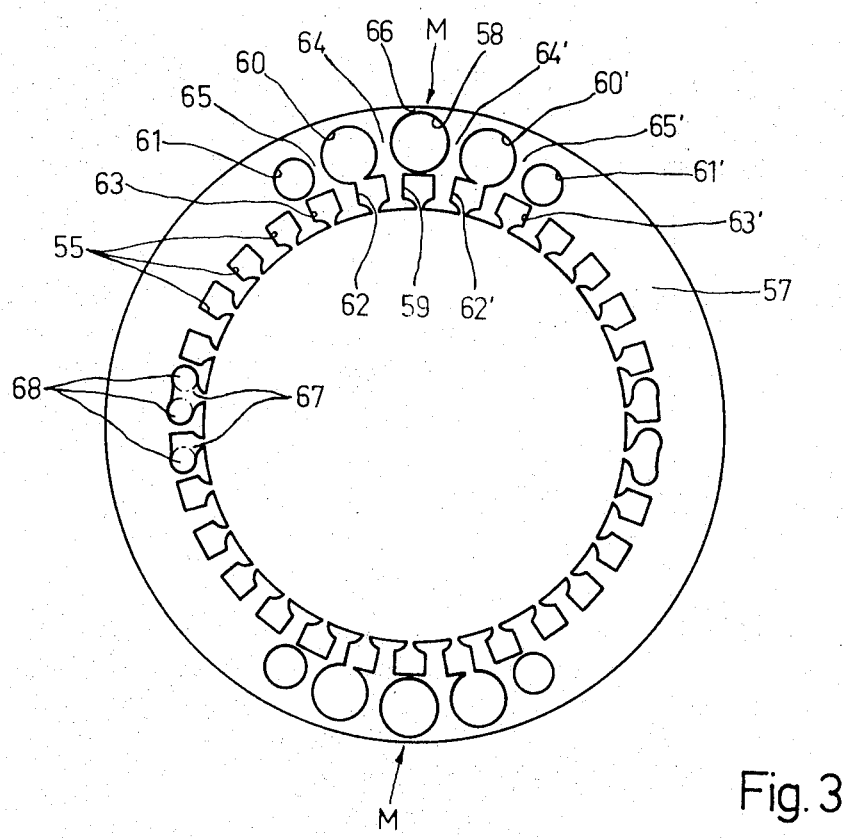
FIG. 3 illustrates a first modification of the rotor configuration shown in FIG. 2.
Figure 4:
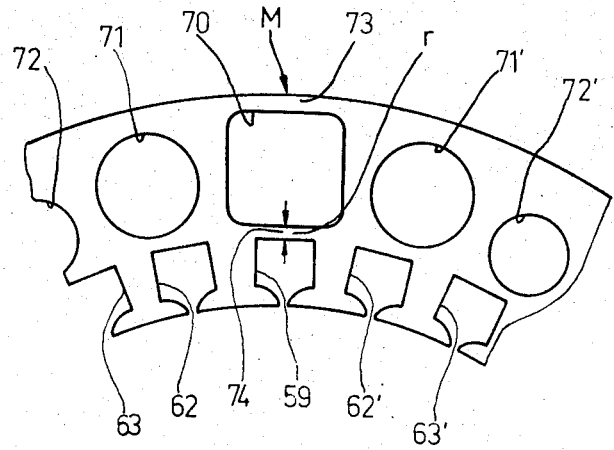
FIG. 4 illustrates a second modification of the rotor configuration shown in FIG. 2.
Figure 5:
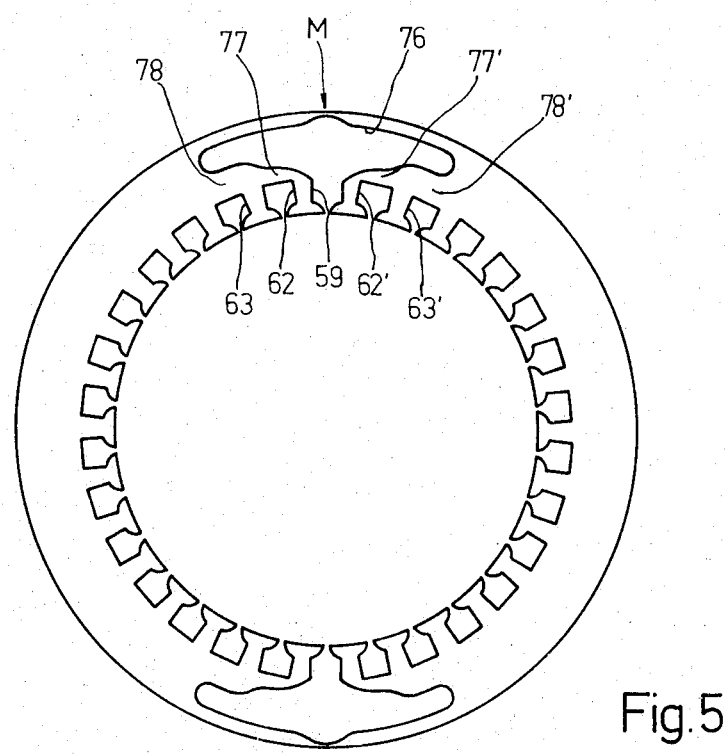
FIG. 5 illustrates a third modification of the rotor configuration shown in FIG. 2.

Rotor plates of this type may be employed in the present invention, if suitably modified, thereby avoiding the necessity of producing specially designated, and therefore expensive rotor plates. FIGS. 3–5 illustrate several suitable modifications.

Figure 6:
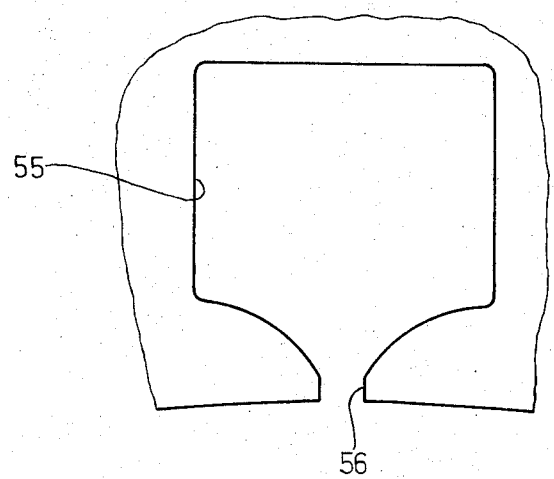
FIG. 6 shows a detail of the rotor configuration of FIG. 5, illustrated with enlarged scale.

The conventional rotor plates of FIGS. 3–6 each have along their respective inner peripheries a plurality of slots intended to accommodate conductors, and which are defined between respective adjoining teeth 59, 62, etc., which latter project in radially inward direction. FIG. 6 depicts an individual slot 55 of generally quadratic configuration and having a relatively narrow slot gap 56, which may for example be of a width of approximately 0.8 mm.

FIG. 3 shows a first possible modification according to the invention of a commercially available rotor plate of conventional type. Before modification, the rotor plate has a given effective yoke cross-section which is substantially constant in circumferential direction. The modification consist in stamping a plurality of holes 58, 60, 60', 61, 61', etc., in the rotor plate, the holes having different dimensions and being so located as to provide the cross-section design of the present invention, despite the provision of identical conductor slots. The largest hole is designated 58 and is spaced from the rotor outer periphery by a small distance corresponding to the narrowest width of rotor portion 66, and it will be appreciated that because this largest hole is provided in the vicinity of the pole middle M, the effective yoke cross-section of the rotor is most reduced at this vicinity. The holes 60, 60' and 61, 61' to either side of hole 58 are of lesser size and reduce the yoke cross-section not as much as the hole 58.

It should be understood that an individual rotor will be formed of a plurality of rotor plates such as that shown in FIG. 3, and that such rotor plates will be stacked with their respective slots and yoke reducing holes in registry so as to define elongated cavities extending longitudinally of the rotor. These slots and holes, and the cavities which they define, may in conventional manner be filled with aluminum, or another non-magnetic material having good electrical conductivity. After such filling, the non-magnetic material filling the slots and yoke reducing holes will constitute non-magnetic rotor portions having the configuration of the spaces filled.

With this in mind, it is particularly advantageous if at least some of the stamped holes 58, 60, 61, etc., intersect neighboring conductor slots, so as to provide, when a plurality of rotor plates are stacked, elongated cavities which are of substantial cross-section and which accordingly are easier to fill with aluminum or another suitable material.

The yoke reducing holes 58, 60, 61, etc., have been illustrated as being circular, but it may be desired to stamp holes of another configuration.

In the rotor plate of FIG. 3 adjacent ones of the yoke reducing holes are separated by magnetically conductive flux path portions designated 64, 64', 65, 65', etc., It will be appreciated that when ultimately a plurality of rotor plates are stacked with their holes and slots aligned, the respective flux path portions 64, 64', 65, 65' will be superimposed and thus extend, in the completed rotor, in longitudinal direction of the same. Likewise, the longitudinal cavities formed by aligned cut-outs 58, etc., which are filled with aluminum or the like to constitute non-magnetic yoke reducing portions will, in the completed rotor be separated by magnetically conductive flux path portions formed of aligned flux path portions 64, 64', 65, 65', etc.

It has been found advantageous, though not absolutely necessary, to position some of the stamped holes 60, 60', 61, 61' so that the magnetic flux path portions 64, 65, etc., separating adjacent ones of the stamped yoke reducing holes will be more-or-less aligned with respective neighboring rotor teeth 62, 62', 63, 63', etc. Likewise it has been found advantageous to so dimension and position the holes 58, 60, etc., of the rotor plate that the flux path portions will have an effective cross-section at most equal to the effective cross-sectional dimension of respective neighboring teeth 62, 63, etc.

By so dimensioning the yoke reducing holes and flux path portions with respect to the effective cross-sectional dimension of neighboring rotor teeth it is possible to just achieve saturation of the flux path portions when the reluctance motor is operating in idling condition; accordingly in loaded condition of the motor, undesired induction irregularities in the air gap can be avoided or significantly reduced, as will be further explained below.

Still discussing the modified rotor plate of FIG. 3, it will be noted that the desired decrease of the rotor tooth width (explained with reference to FIG. 2, previously) can be achieved, despite the presence of preformed, indentically spaced rotor teeth by punching out or otherwise producing auxiliary holes 68 which serve to narrow the effective tooth width in the vicinity of pole ends. The punched holes 68 may be produced by circular punches whose punch configuration is indicated in FIG. 3 by dotted-lines at holes 68, or the holes 68 may be produced in any other suitable fashion.

FIG. 4 illustrates a further modification of a commercially available rotor plate of conventional type. In particular, it will be appreciated with respect to the yoke reducing hole 58 of the rotor plate in FIG. 3, that the radial spacing between the hole 58 and the rotor outer periphery, as well as the radial spacing between the hole 58 and the adjoining conductor slot, is quite small, and that the rotor is accordingly greatly weakened at these locations. In the interest of mechanical strength, it is desirable to make at least the largest hole, —i.e., the hole in the vicinity of the pole middle— of quadratic configuration, as done with the yoke reducing hole 70 in FIG. 4. With such configuration, or the equivalent, sizable rotor portions 73 and 74 are left between the hole and rotor periphery, and between the hole and conductor slot, so as to significantly increase the mechanical strength of the rotor at these locations over that associated with the corresponding rotor portions in FIG. 3. That the rotor portions 73 and 74 be possessed of a certain mechanical strength is important, especially because after prolonged use of the reluctance motor of the invention, the mechanical structure of the aluminum conductors filling the aligned conductor slots will undergo changes which may alter its physical form. It will be appreciated that the increased mechanical strength thus achieved will decrease the magnetic resistance of the rotor at the pole middle only a little below that of the similar construction in FIG. 3. By narrowing the effective yoke cross-section of the rotor over a substantial percentage of the pole span, the design of the invention makes possible the conjunction of both of these requirements, in contrast to known arrangements according to which the desired high qudrature-axis reactance could be achieved only with very thin, mechanically weak rotor portions (having for example a thickness of 0.4 mm; see FIG. 11) The greater thickness of portions 73, 74 in FIG. 4 results in improved performance during asynchronous operation, too.

FIG. 5 illustrates a further design possibility. According to this modification, yoke reducing holes 76 are punched out, or otherwise produced, in commercially available rotor disks. The yoke reducing holes 76 are of symmetrical configuration and have in outline the general shape of a flying bird. The holes 76, importantly, are each positioned at a pole middle and, in this embodiment, the hole 76 intersects conductor slot 59, and is widest at the pole middle M so as to effect at the pole middle the greatest reduction in the effective magnetic cross-section of the rotor yoke. The hole 76 is so configured that the rotor yoke cross-section increases continuously in direction towards the respective pole ends, and it will be seen that the cut-out or hole 76 extends over a substantial percentage of a pole span.

It is important to note, with respect to the modification of FIG. 3, that the hole 76 and rotor teeth 62, 62', 63, 63' define magnetic flux path portions 77, 77', 78, 78', which are so designed as to be magnetically saturated when the motor is in idling condition.

The embodiments of FIGS. 3–5, like the embodiment of FIG. 1, affords greatly increased pull-in and pull-out torque, and it must be presumed that such increase, too, is the result of an increase of magnetic resistance in the quadrature direction and of an improved flux distribution, especially in the motor air-gap.

FIG. 7–10 will serve to bring out somewhat more clearly the theoretical aspects of the present invention.

It is customary, in analyzing the performance of reluctance motors, to divide the motor flux into direct-axis and quadrature-axis components, i.e., into flux components $\phi_1$ and $\phi_q$, respectively, representing the flux passing in the direction of least reluctance and that passing in the direction of greatest reluctance.

Figure 7A:
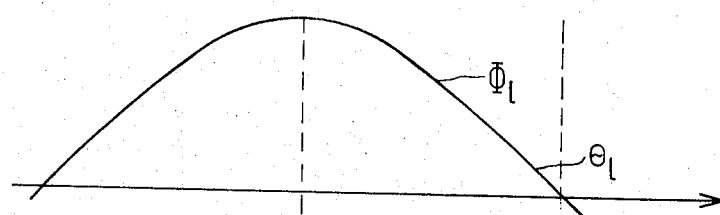
FIG. 7a is a graph of direct-axis flux, plotted alongside the developed rotor of FIG. 7.

FIG. 7a illustrates the direct-axis component of flux $\phi_1$, which is in phase with the direct-axis component of magnetomotive force $\theta_1$. The rotor illustrated in FIG. 7, in developed view, is one constructed according to the prior art, and provided with only a single hole 82 serving to narrow the yoke cross-section in the vicinity of a pole middle M. The prior art rotor illustrated has identical conductor slots 81, and it will be seen from the Figure that the direct-axis component of flux $\phi_1$ (represented by flux-lines 83) is split into two components by the hole 82.

Figure 7:
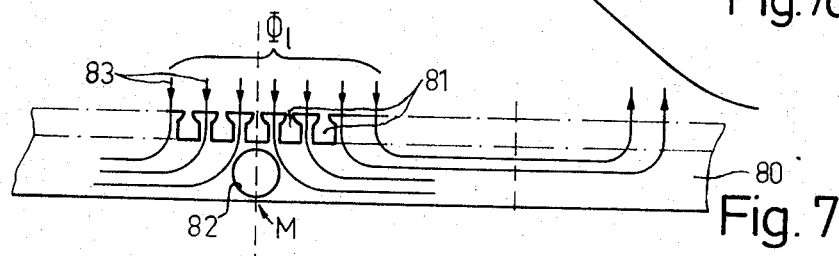
FIG. 7 illustrates in developed view a rotor according to the prior art.
Figure 8A:
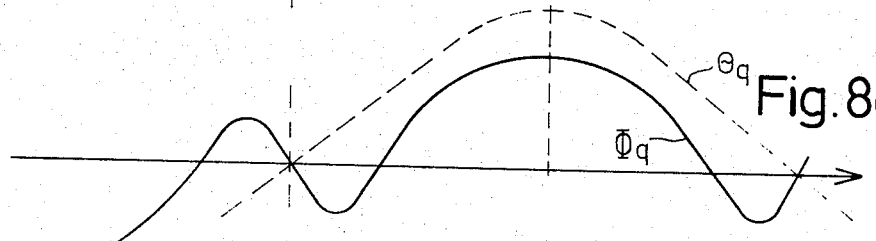
FIG. 8a is a graph of quadrature-axis flux, plotted alongside the developed rotor of FIG. 8.
Figure 8:
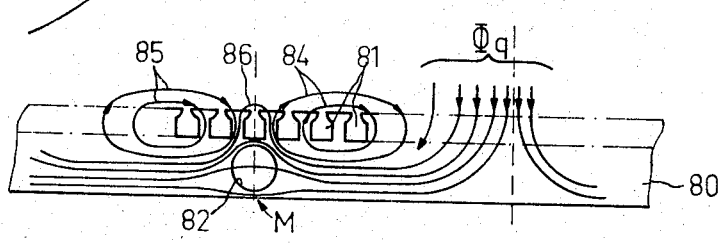
FIG. 8 illustrates in developed view a rotor according to the prior art.

FIG. 8 shows in developed view the rotor 80 of FIG. 7; FIG. 7a is graph of quadrature-axis flux $\phi_1$ and quadrature-axis mmf $\theta_q$ plotted alongside the developed rotor. This quadrature-axis flux $\phi_q$ has a dip in the region of the pole middle M. By way of explanation, it is noted that the flux is in effect diverted by hole 82 and flows back at least in part to the non-illustrated stator, this being indicated by flux-lines 84 and 85. Also, some of the flux is diverted by the hole 82 and flows out of the rotor and back through neighboring rotor teeth, this being illustrated by flux-line 86. These flux components constitute quadrature-axis stray flux. It should be clear that this flux is in effect evidence of an induction "hump", which in fact may also be demonstrated by experimental measurements of the induction distribution.

Figure 9A:
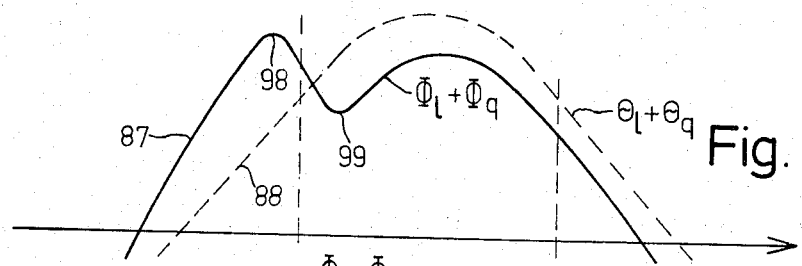
FIG. 9a is a graph of total flux, plotted alongside the developed rotor of FIG. 9.
Figure 9:
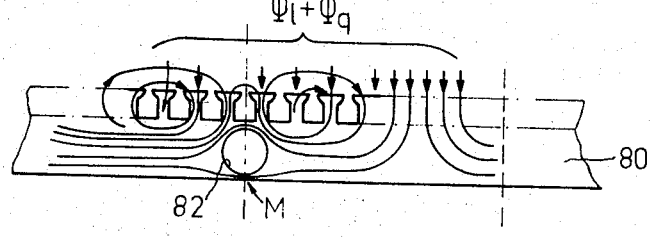
FIG. 9 illustrates in developed view a rotor according to the prior art.

FIG. 9, 9a resembles FIGS. 7, 7a and 8, 8a, but presents a superposition of the flux and mmf illustrated in those Figures, and was derived by measurement of the air-gap induction distribution. Curve 87 of FIG. 9a clearly shows an undesirable flux dip in the region of the pole middle M.

With the construction of the rotor of an external-rotor reluctance motor according to the invention, such induction dip is largely avoided, this having been demonstrated experimentally by measuring the air-gap induction distribution. By employing the rotor of the invention, the flux distribution in the air-gap approaches much more nearly the ideal sinusoidal form.

Figure 10:
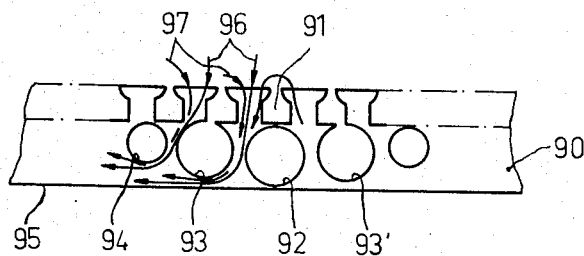
FIG. 10 illustrates in developed view a rotor according to the present invention.

FIG. 10 illustrates in developed view a rotor according to the invention, the flux-lines there depicted indicating the improved flux distribution achieved. The improvement is due to the effective magnetic-cross-section between the holes and the outer periphery 95 of the rotor 90, which is here so dimensioned as to be substantially saturated by direct-axis flux when the motor is in idling condition. If, now, under load conditions a quadrature-axis stray flux is applied, represented in FIG. 10 by flux-lines 97, the magnetic resistance of the ferromagnetic rotor material to such quadrature-axis stray flux will rise steeply, since the magnetic material will become oversaturated. In this way, the induction hump 98 of FIG. 9a will be reduced and the dip 99 insreased—i.e., the quadrature-axis stray flux will be compensated, the flux distribution improved, and a higher torque afforded.

Figure 11B:
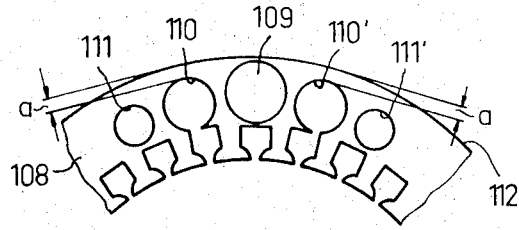
FIG. 11b illustrates a rotor configuration according to the invention.
Figure 11A:
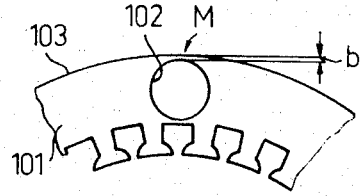
FIG. 11a illustrates a rotor configuration according to the prior art.
Figure 11C:
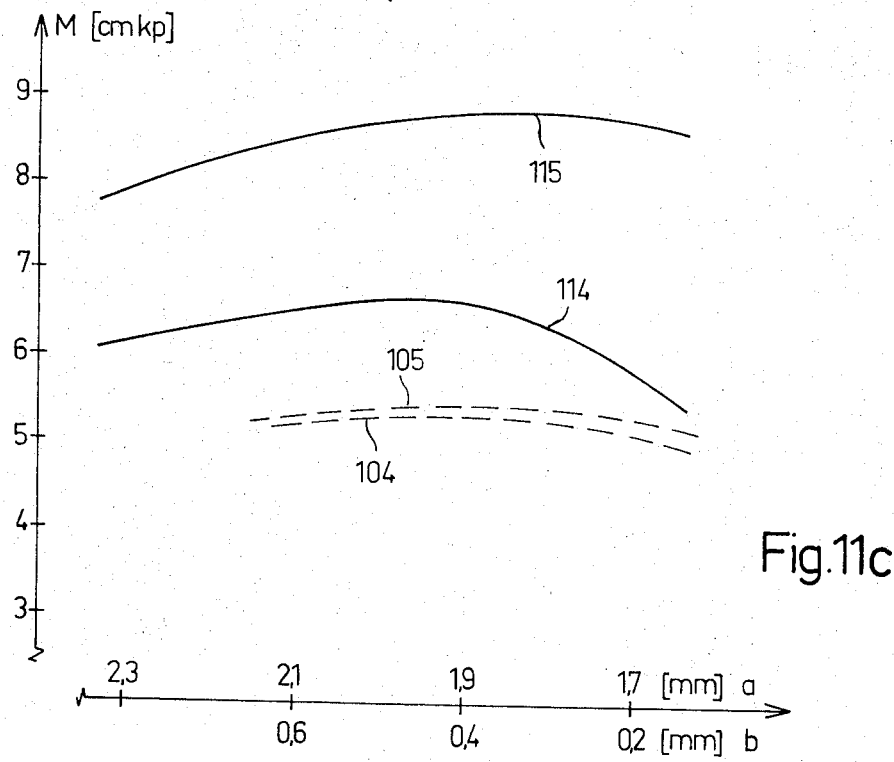
FIG. 11c is a graph of torque characteristics experimentally determined for the rotor configurations of FIGS. 11a and 11b.

FIG. 11a illustrates a portion of a rotor according to the prior art, FIG. 11b a portion of a rotor according to the invention. FIG. 11c is a graph showing results of tests of reluctance motors employing external rotors according to the prior art and according to the invention, the motors being in other respects identical and tested under substantially identical running conditions.

In particular, the prior art rotor of FIG. 11a is designated 101 and its rotor yoke is provided with only one hole 102 in the region of pole middle M which is separated from the rotor periphery 103 by a small radial distance b. The separation b was varied during the test after each determination, by reducing the rotor diameter by 0.2 mm at a time, on a lathe. The pull-in torque obtained when employing the rotor 10 is represented by curve 104. The curves in FIG. 11c are plotted with the radial spacing from the rotor periphery as abscissa, and the measured torque as ordinate. Curve 105 shows the pull-out torque achieved when using the prior art rotor, for different radial spacings as just explained. Maximum torque was achieved with the prior art rotor when the radial spacing b equalled approximately 0.4 mm.

In FIG. 11b a rotor designed according to the invention is generally designated by numeral 108, and corresponds somewhat to the rotor design of FIG. 3. The rotor is provided with a series of five non-magnetic portions 109, 110, 110′, 111, 111′ serving to reduce the effective crossseiction of the rotor yoke. The non-magnetic portions 109, 110, 110′, 111, 111′ were formed, as described before, by first punching holes in rotor plates, stacking the rotor plates with corresponding holes in registry so as to form elongated cavities, and then filling such cavities with aluminum or the like to form non-magnetic yoke reducing portions extending in longitudinal direction of the rotor. Likewise, the conductor slots provided along the inner periphery of the rotor 108 were formed by originally punching slots (if not already provided) in a plurality of identical rotor plates, these plates then being stacked with corresponding conductor slots aligned so as to form elongated cavities which, with the cavities formed by the punched holes 109, 110 etc., were filled with aluminum, aluminum alloy or another suitable electrially conductive, non-magnetic material.

With the rotor 108, the radial spacing A between the non-magnetic portion 110 and the rotor periphery 112 was varied during the course of an experiment. Specifically, after each test measurement, the distance A was reduced by 0.2 mm, by filing. In FIG. 11c curve 114 shows the pull-in torque for rotor 108 with various spacings A, and curve 115 shows the pull-out torque. Optimal valves were achieved when radial spacing A equalled approximately 1.9 mm. The pull-in torque was improved by approximately 25 percent, and the pull-out torque by approximately 60 percent.

It will be appreciated that for a given motor size and construction type, the expedient of the present invention, although very simple, affords greatly improved torque characteristics.

It hardly need be explained that the constructions actually depicted herein for the sake of illustration may be considerably modified without departing from the concept of the present invention. Likewise, it is noted that the feature of providing yoke reducing non-magnetic portions has here been illustrated by providing non-magnetic portions of for instance aluminum. It will be understood that non-magnetic portions of any kind may be provided, and that in some circumstances the non-magnetic portions may in fact consist of voids. Also, whereas the rotor shell has been depicted as a single cylindrical shell, certain applications may of course require different configurations. Thus, the exact orientations of poles, pole spans, etc., and the exact orientations of quadrature-axis and direct-axis flux components shown, is merely for the purposes of illustration, and of course is not to be considered limiting in any sense. With regard to the saturation of certain flux path portions, for example, this important possibility according to the present invention would be no less significant in a different rotor configuration.

It will be understood that each of the elements described above, or two or more together, may also find a useful application in other types of constructions differing from the types described above.

While the invention has been illustrated and described as embodied in an external-rotor reluctance motor, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. An external-rotor reluctance motor having a rotor provided with a plurality of pole portions each having respective pole ends, a pole span between said ends and a pole middle, said rotor having a given effective yoke cross-section over part of the respective span and a lesser effective yoke cross-section in the vicinity of a respective pole middle and over a substantial portion of the associated pole span, and wherein said rotor has an outer periphery, and wherein said rotor is provided over a substantial portion of a respective pole span with a plurality of circumferentially spaced yoke-reducing non-magnetic portions of different dimensions spaced from said outer periphery and serving to reduce said given effective yoke cross-section to said lower effective yoke cross-section, and wherein said rotor comprises circumferentially spaced magnetically conductive flux-path portions separating adjacent ones of said non-magnetic portions and wherein said non-magnetic portions are largest in the region of the respective pole middle and smaller in the other regions of the respective pole span.

2. A motor as defined in claim 1, wherein said non-magnetic portions are largest in the region of the respective pole middle and successively smaller in direction towards the respective pole ends.

3. A motor as defined in claim 1, said rotor being provided with slots filled with electrically conductive non-magnetic material forming a squirrel-cage winding, and said rotor having an inner periphery, and further having radially inwardly projecting teeth provided in the region of said inner periphery; and wherein at least some of said magnetically conductive flux-path portions are substantially aligned with and merge into respective neighboring teeth.

4. A motor as defined in claim 2, said rotor being provided with slots filled with electrically conductive non-magnetic material forming a squirrel-cage winding, and said rotor having an inner periphery, and further having radially inwardly projecting teeth provided in the region of said inner periphery; and wherein at least some of said magnetically conductive flux-path portions are substantially aligned with respective neighboring teeth and merge into the same.

5. A motor as defined in claim 4, wherein at least some of said non-magnetic portions merge with neighboring slots of said squirrel-cage winding.

6. A motor as defined in claim 3, each of said teeth having an effective respective cross-sectional dimension and each of said magnetically conductive flux-path portions having a respective effective cross-sectional dimension, and wherein the effective cross-sectional dimension of at least some of said flux-path portions is substantially equal to the effective cross-sectional dimension of respective neighboring teeth.

7. A motor as defined in claim 4, wherein said flux-path portions of respective pole portions of said rotor to either side of the respective pole middle are so dimensioned that during idling of said motor the majority of said flux-path portions are in magnetic saturation.

8. A motor as defined in claim 1, wherein said flux-path portions of respective pole portions of said rotor to either side of the respective pole middle are so dimensioned that during idling of said motor the majority of said flux-path portions are in magnetic saturation.

9. A motor as defined in claim 8, said inwardly projecting teeth being provided in the region of said rotor inner periphery on a substantial part of the pole span of at least one pole portion, and each of said teeth having a respective cross-sectional dimension, and wherein the respective cross-sectional dimension of teeth located in the vicinity of the pole middle is greater than the respective cross-sectional dimension of teeth located in the vicinity of the respective pole ends.

10. A motor as defined in claim 1, wherein said rotor comprises a plurality of stacked substantially identical rotor plates each having a plurality of yoke-reducing cut-outs, said plates being stacked with said cut-outs in registry, and said cut-outs forming yoke-reducing cavities extending lengthwise of said rotor; and wherein said yoke-reducing non-magnetic portions are accommodated in respective ones of said yoke-reducing cavities, wherein said non-magnetic portions accommodated in said cavities consist at least substantially of electrically conductive material, and wherein said conductive material is aluminum.

11. A motor as defined in claim 1, wherein said rotor comprises a plurality of stacked substantially identical rotor plates each having a yoke-reducing cut-out per pole, each yoke-reducing cut-out being located in the vicinity of the respective pole middle and extending over a substantial portion of the respective pole span, said plates being stacked with said yoke-reducing cut-outs in registry so as to form yoke-reducing cavities extending lengthwise of the rotor; and further including portions of non-magnetic material accommodated in said yoke-reducing cavities.

12. An external-rotor reluctance motor comprising in combination a stator provided with a stator winding; an external-rotor assembly comprising mounting means defining an axis of rotation and a magnetic external-rotor core having a generally annular transverse cross-section with a radially inner periphery and a radially outer periphery, said external-rotor core surrounding said stator and being carried by said mounting means for rotation about said axis, said magnetic external-rotor core including a plurality of circumferentially spaced flux path portions extending along the length of said external-rotor core and forming therebetween a plurality of circumferentially spaced slots extending along the length of said external-rotor core, with said flux-path portions furthermore extending in direction from the inner periphery of said external-rotor core towards the outer periphery of said external-rotor core, and a yoke section extending in circumferential direction of said external-rotor core and joining said flux-path portions together at the radially outer portion of said external-rotor core, with the radially outermost portions of at least some of said slots being disposed at respective different radial distances from the outer periphery of said external-rotor core to form said yoke section with a width measured in direction radially of said core which has a predetermined smallest value at at least two circumferentially spaced locations to define two direct-axis pole middles presenting maximum reluctance to quadrature-axis flux passing through said locations in direction circumferentially of said external-rotor core, and has a predetermined largest value at at least two further circumferentially spaced locations to define at least two quadrature-axis pole ends presenting minimum reluctance to direct-axis flux passing through said further locations in direction circumferentially of said external-rotor core.

13. A motor as defined in claim 12, wherein those of said slots located to either side of said pole-middles are successively disposed at increasing radial distances from the outer periphery of said external-rotor core, so that said yoke section has a width measured in direction radially of said core which increases in direction circumferentially away from said pole-middles.

14. A motor as defined in claim 12, wherein said slots include a plurality of first slots located at the radially inward portion of said external-rotor core and a second plurality of slots located radially outwards of said first slots and discrete from said first slots, and wherein said second slots are located to either side of said pole-middles, and wherein the width of successive ones of said second slots measured in direction radially of said core decreases in direction circumferentially away from the respective pole middles.

15. A motor as defined in claim 12, wherein said slots include a plurality of circumferentially spaced first slots located at the radially inward portion of said external-rotor core, and wherein there is located at each of said pole middles a second slot having a width measured in direction radially of said external-rotor core which decreases in direction circumferentially away from the respective pole middle, and having an angular span measured with respect to said axis including a plurality of said first slots.

16. A motor as defined in claim 12, wherein said slots are filled with non-magnetic electrically conductive material forming a squirrel-cage winding.

17. A motor as defined in claim 14, wherein at least some of said second slots are substantially aligned in direction radially of said external-rotor core with some of said first slots.

18. A motor as defined in claim 12, wherein said flux-path portions and said slots are so dimensioned that in the region of said pole middles at least some of said flux-path portions are substantially magnetically saturated when said motor is idling.

19. A motor as defined in claim 12, wherein the effective width of said flux-path portions measured in direction circumferentially of said external-rotor core is greatest at said pole middles and smallest at said pole ends.

* * * * *